United States Patent [19]

Ackerman et al.

[11] Patent Number: 5,183,267
[45] Date of Patent: Feb. 2, 1993

[54] SEAL FOR SENDING UNIT

[75] Inventors: Yuri Ackerman, Chicago, Ill.; Joseph A. Gutierrez, Farmington Hills, Mich.

[73] Assignee: Chicago Rawhide Manufacturing Co., Elgin, Ill.

[21] Appl. No.: 131,107

[22] Filed: Dec. 10, 1987

[51] Int. Cl.⁵ .............................................. F16J 15/12
[52] U.S. Cl. ..................................... 277/12; 277/166; 277/180; 277/211; 277/235 R; 340/450.3
[58] Field of Search ................. 277/12, 166, 136, 137, 277/180, 235 R, 208, 209, 211, DIG. 4, 237 A; 411/531, 542, 545; 340/450.3; 285/220, 211, 212, 189

[56] References Cited

U.S. PATENT DOCUMENTS

| | | | |
|---|---|---|---|
| 126,624 | 5/1872 | Coffee | 277/211 |
| 2,882,081 | 4/1959 | Tobias | 277/166 |
| 2,958,551 | 11/1960 | Rogers | 277/152 X |
| 2,995,782 | 8/1961 | Heller | 277/166 |
| 3,062,557 | 11/1962 | Underwood | 277/166 |
| 3,168,321 | 2/1965 | Glicksman | 277/180 |
| 3,204,230 | 8/1965 | Hosford, Jr. | 340/450.3 |
| 3,259,404 | 7/1966 | Papenguth | 411/531 X |
| 3,519,279 | 7/1970 | Wagner | 277/166 |
| 3,638,906 | 2/1972 | Yano | 285/220 X |
| 3,726,178 | 4/1973 | Dimitry | 277/166 |
| 4,118,041 | 10/1978 | Futamura | 277/166 |
| 4,191,389 | 3/1980 | Jelinek | 277/166 |
| 4,345,739 | 8/1982 | Wheatley | 277/166 |
| 4,712,802 | 12/1987 | Hewison et al. | 277/166 |

FOREIGN PATENT DOCUMENTS

| | | | |
|---|---|---|---|
| 557334 | 3/1960 | Belgium | 277/211 |
| 960242 | 12/1974 | Canada | 277/211 |
| 849343 | 11/1939 | France | 277/180 |
| 836197 | 6/1960 | United Kingdom | 277/180 |
| 969700 | 9/1964 | United Kingdom | 277/211 |
| 1046456 | 10/1966 | United Kingdom | 411/542 |
| 1390756 | 4/1975 | United Kingdom | 277/211 |

*Primary Examiner*—Allan N. Shoap
*Attorney, Agent, or Firm*—Lockwood, Alex, FitzGibbon & Cummings

[57] ABSTRACT

An oil seal unit for disposition between mating parts having opposed end face sealing surfaces. The seal unit has a casing with a radial flange having opposed end face surfaces and an inner margin portion. An elastomeric seal body with radially inner, outer and intermediate body portions is bonded to the casing. The seal body includes a radially space apart, continuous circular sealing ribs over lying each face of the casing; the seal body also has a radially inner portion defining an opening through which the shank portion of the mating part extends. The intermediate part of the seal body includes a collar element which deforms into snug fluid-tight sealing engagement within a recess defined in part by the seal and in part by portions of the mating parts.

10 Claims, 2 Drawing Sheets

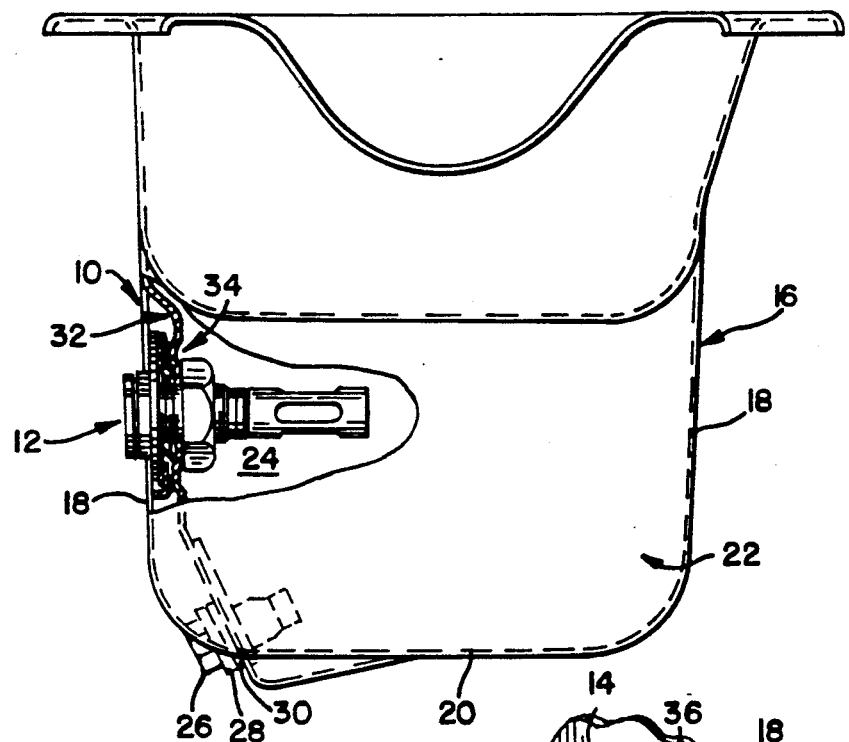
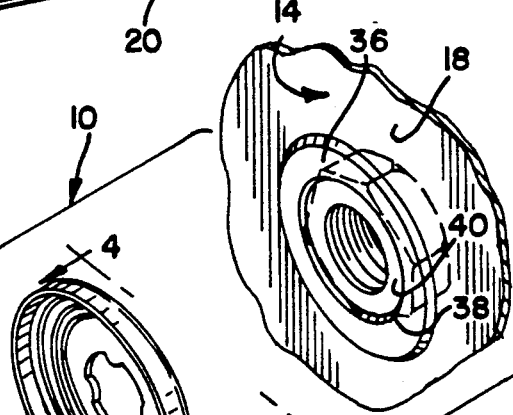
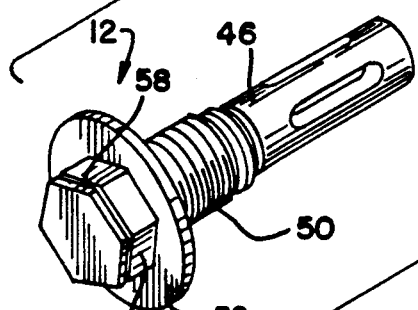
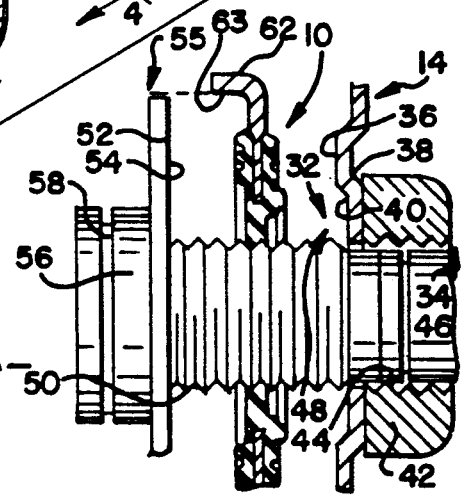

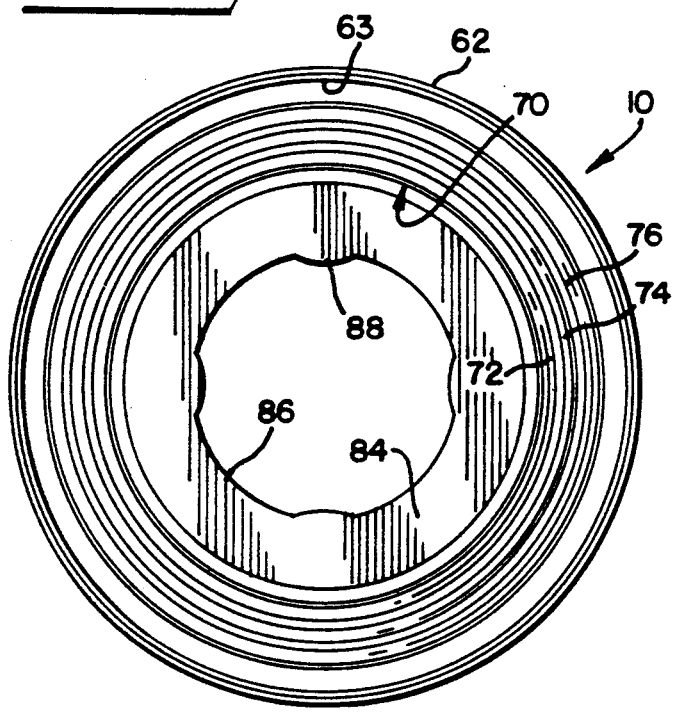
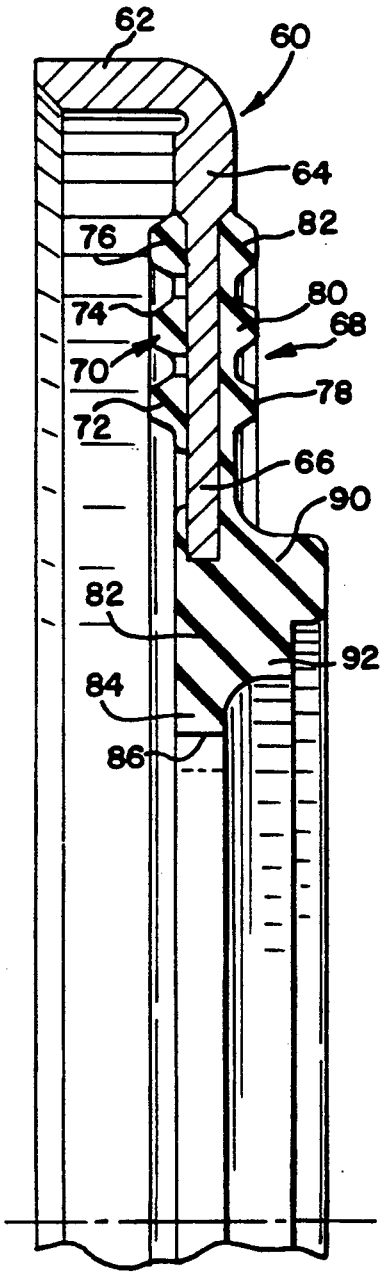
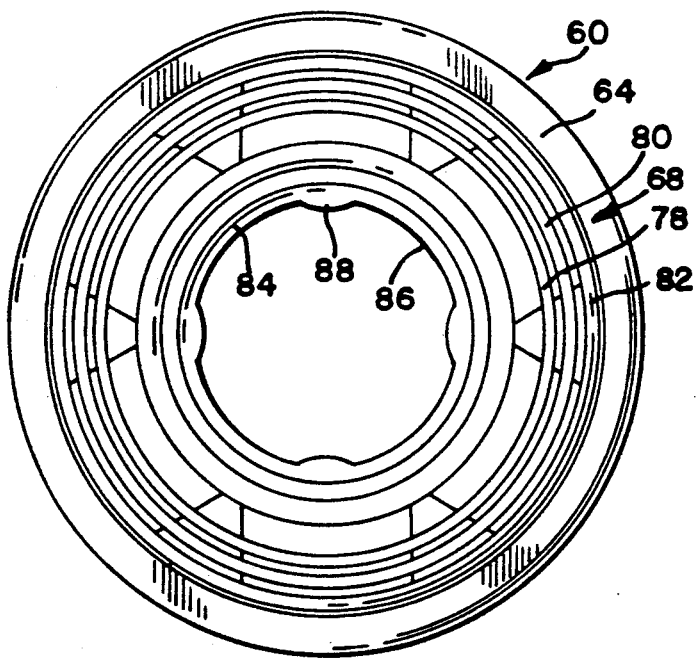

SEAL FOR SENDING UNIT

BACKGROUND OF THE INVENTION

The present invention relates generally to fluid seal, and more particularly, to a specialized type of fluid seal adapted to provide multiple functions in use, and to do so at low cost with a high degree of reliability.

In recent years, there has been a definite trend in the automotive industry towards manufacturing engine and driveline components of increasing compactness and complexity. With constantly increasing emphasis being placed on increased economy of operation, the automotive industry has responded by making most of its automobiles smaller, lighter and more compact. This, in turn, has created the need for smaller but "harder working" engines, and the contemporaneous requirements of holding automotive emissions to an absolute minimum has further occasioned the manufacture of engines which are required to contend with very high operating temperatures.

At the same time that the foregoing trends have been in evidence, there has been an additional trend, particularly because of the high cost of labor, to reduce scheduled engine and chassis maintenance to an absolute minimum. Consequently, it is not unusual for automobiles of today to have recommended oil change intervals ranging from 4,000 to perhaps 7,500 miles between changes. Industry, in some cases, specifies synthetic oils or those having special additive packages which can accommodate lengthened intervals between changes and still provide the numerous functions required of lubricants forced to operate under severe conditions.

As a result of the infrequent scheduling of oil changes, in effect, a premium has been placed on ensuring that the crankcase oil in an automobile is maintained at a proper level between changes. Since the extended oil change intervals may, in effect, occasion an attitude of neglect or at least less frequent checking on the part of the automobile owner, the importance of ensuring that the oil level does not fall below critical limits is emphasized even further, it being recognized that severe, expensive engine damage may result from a lubrication failure occasioned by low crankcase oil levels.

An approach recently followed by some auto designers, therefore, has been to provide not only oil pressure sending units of the conventional type, but to include oil level indicator sending units in the oil pans of engines to insure that even neglectful owners are not victimized by serious engine damage occasioned by low oil levels in the use of their vehicles.

According to the present invention, a novel oil seal for an oil level indicator sending unit is provided which will serve a number of functions. By way of further background, it will be realized that, unlike a simple oil pan drain plug, same oil level indicator sending units are, in effect, a combination mechanical plug and electrical instrument, and consequently, it is not always preferred to attempt to ensure against oil leakage merely by applying an extremely strong sealing torque to the unit. In some case, however, the installation torque may be very high. Consequently, there has been a need for a seal unit which will accomplish several objects in use, among them being reliability and leakproof performance, whether the installation is made into a sheet metal or a cast aluminum part such as an oil pan.

In addition, there has been a need for a seal which may be positioned as desired over the oil level indicator sending unit or other instrument prior to installation so as to eliminate the need for prealignment and to reduce the likelihood that the seal may be placed in an improper position prior to installation and tightening.

Another need has been to provide a seal which will accommodate dimensional and torque value variations within a given installation and still provide the necessary fluid-tight seal; there is quite clearly also a need to accomplish the foregoing objectives at a reasonable price.

Accordingly, it is the primary object of the present invention to provide an improved oil seal unit for installation between mating parts and characterized by improved versatility in use.

Another object of the invention is to provide an oil seal which provides at least one, and preferably a plurality of elastomeric ribs or like formations adapted to be trapped between opposed end faces of parts to be sealed.

A further object of the invention is to provide a seal which may be positioned relative to, and retained on, one of the two parts until the assembly operation has been completed.

Yet another object of the invention is to provide a seal unit which includes a casing and an elastomeric seal body having several functional portions, one providing a pair of end face seals, another providing a cavity or recess filling function, a third portion providing a seal retention feature, and another portion insuring that the seal casing does not move radially relative to the body of the sealing unit during installation.

A still further object of the invention is to provide a seal which optionally includes a flanged casing adapted to protectively surround a part of the installed sending element.

A further object is to provide a combination sending unit, oil pan and seal unit capable of reliable performance.

Yet another object of the invention is to provide a seal unit which may be made with existing technology but which provides multiple functions in use and which is consistent with existing installation technology.

A still furhter object is to provide a seal wherein the rubber element is strongly bonded to the casing to avoid displacement even under high torque conditions of installation.

The foregoing and other objects and advantages of the invention are achieved in practice by providing an oil seal adapted to be disposed between portions of mating parts which have opposed end face surfaces and in which the seal unit includes a casing having bonded thereto an elastomeric body with inner, outer and intermediate portions each adapted to provide a specialized sealing and/or locating and positioning function in the use of the seal.

The manner in which the foregoing and other objects and advantages of the invention are achieved in practice will become more clearly apparent when reference is made to the following detailed description of the preferred embodiment of the invention set forth by way of example and shown in the accompanying drawings, wherein like reference numbers indicate corresponding parts throughout.

BRIEF DESCRIPTION OF THE DRAWINGS

FIG. 1 is an elevational view of a part of the front of the engine, partly in elevation and partly in section, and showing the novel seal of the invention in a position of use between a part of an automotive engine oil pan and a part of an oil level indicator sending unit;

FIG. 1A is a greatly enlarged fragmentary exploded sectional view, showing the elements of FIG. 1 just prior to final assembly;

FIG. 2 is a fully exploded perspective view of the sending unit, the seal unit and a portion of the oil pan showing these units prior to initial assembly;

FIG. 3 is an elevational view of the seal of FIGS. 1 and 2, taken along lines 3—3 of FIG. 2 and showing the outwardly directed end face of the seal element;

FIG. 4 is a front elevational view of the seal of FIGS. 1-3, taken along lines 4—4 of FIG. 2 and showing the inner end face of the seal unit; and FIG. 5 is a further enlarged fragmentary vertical sectional view of the seal unit of the invention, showing the casing and the multi-function elastomeric seal body portion thereof.

DESCRIPTION OF THE PREFERRED EMBODIMENTS OF THE INVENTION

While it will be understood that the seal of the invention may be used in a number of applications, a detailed description thereof will be given wherein the seal is positioned between a portion of an oil level indicator sending unit and a portion of an associated automotive engine oil pan unit.

Referring now to the drawings in greater detail, FIGS. 1, 1A and 2 show a novel seal unit of the invention, generally designated 10, to be disposed between a portion of an oil level indicator sending unit generally designated 12, and a contoured portion generally designated 14 of an automobile engine oil pan unit generally designated 16. As shown in detail in FIG. 1, the oil pan unit 16 includes a plurality of sidewalls 18, and a bottom wall portion 20, which walls combine to define a sump generally designated 22 and shown to have an interior portion 24 for receiving a supply of automotive engine oil.

FIG. 1 also shows that a removable drain plug 26 is provided in a lower portion of one the oil pan sidewalls 18 and is adapted to be sealed therein in a conventional manner, usually by tightening the opposed metal flange sealing surfaces 28, 30 into fluid-tight relation by the application of a relatively high torque.

Referring now in particular to FIG. 1A and to the contoured portion 14 of one of the oil pan sidewalls 18, this portion 14 is shown to include a recessed area generally designated 32 and shown to be formed in the pan adjacent a receiver area generally designated 34 for the oil level indicator sending unit 12. The recessed area 32 includes a raised or axially outer end face sealing surface 36, a tapered offsetting surface 38 and a recessed, radially inner end face sealing surface concentrically arranged with respect to surface 36 and including an axially inner surface to which a captive nut 42 is secured, as by welding. The nut 42 includes a threaded opening 44 for the passage of the shank portion 46 of the sending unit 12. An annular countersunk area generally designated 48 lies between the outer and inner, axially offset end face sealing surfaces 36, 40.

Referring in particular to FIG. 2, it is shown that, in addition to the inner shank portion 46, the sending unit 12 includes a threaded intermediate section 50, a radially extending flange unit 52 having an inner end face surface 54 (FIG. 1A) which in use is disposed in opposed facing relation to the oil pan end face surfaces 36, 40. The indicator sending unit 12 includes a head portion 56 of conventional hex-head construction, and the head 56 may in turn further include an annular groove 58 for reception of a snap ring for retaining an electrical fitting (not shown) used with the sending unit 12.

Referring now in greater detail to the seal element 10, FIGS. 3-5 show that the seal includes a casing unit generally designated 60 and having an axial centering flange 62 and a radial bonding 64, the inner margin 66 of which has opposed end face surfaces to which are bonded a pair of substantially identical, axially inner and outer, multiple rib seal arrays generally designated 68, 70, respectively. As shown in FIG. 3, the axially outer array 70 includes plurality of individual ribs 72, 74, 76 which are concentric, continuous, and radially spaced apart. The inside array 68 also includes plural individual ribs 78, 80, 82, which are substantially identical to their counterparts 72-76 on the outer end face surface of the margin 66.

The seal unit 10 also includes an elastomeric body portion generally designated 82 which is subdivided into a radially innermost web 84 having a generally cylindrical, axially extending inner surface 86 interrupted by circumferentially spaced apart means in the form of ears 88 for engaging the threaded portion 50 of the oil level indicator sending unit during assembly. The intermediate portion of the elastomeric seal body 82 includes means in the form of a deformable collar 90 extending axially beyond said sealing ribs 78, 80, 82 and an annular shoulder surface 92 lying radially inwardly of the remainder of the collar 90. The seal collar 90 and its shoulder portion 92 are adapted in use to extend into the countersunk recess 48 between the axially offset end face surfaces 36, 40 forming parts of the oil pan and the inner end face 54 of the sending unit flange 52 when the sending unit 12 and the seal 10 are assembled in relation to the oil pan 16 as shown in FIG. 1.

Referring now to the assembly of the parts, including the seal unit of the invention, FIG. 2 shows that, prior to initial assembly, the sending unit 12, the seal unit 10, and the threaded opening 44 and the nut 42 are capable of coaxial alignment. In use, the seal 10 is positioned over the shank, with the ears 88 engaging the threaded surface portion 50 of the sending unit shank 44. This engagement permits the parts 10, 12 to be treated as a subassembly prior to actual installation. In this connection, it will be understood that FIG. 2 is illustrative and that in practice, the seal might be preassembled over the threaded shank 50 in another location. When the time comes for assembling the composite seal and the sending unit in position within the crankcase, the two are positioned as is somewhat schematically illustrated in FIG. 1A, that is, with the shank 46 being positioned within the threaded opening 44 and with the seal and sending unit 10, 12 then being advanced to a position wherein there is mutual engagement of the threads 44, 50. A tightening action is then commenced and the seal finally assumes the position shown in FIG. 1, that is with the threads fully taken up and the seal collar 90 and its inner annular shoulder surface portion 92 deformed into snug sealing engagement with the axially offset, concentrically arranged sealing surfaces 36, 40. In this manner, the seal is able to accommodate whatever tolerance variation may be present in the offset surfaces, which are formed in another operation.

When the units are assembled the inner surface 63 of the axial casing flange 62 is spaced just radially apart by a working clearance from the radially outer edge 55 of the sending unit flange 52. This prevents installation torque from moving the seal off center as the various ribs engage the flange and pan surfaces 54, 36, 38, 40.

While the reasons for the success of the seal unit of the invention are not known with certainty, and while the invention is not intended to be limited to any particular theory of operation, it is believed that the provision of the ribs and the deformable collar assembly provides the ability to deform and take up whatever irregularities may be present in the parts without sacrificing the overall vibration absorption and rigidifying characteristics necessary to effect a proper fluid-tight seal. As pointed out, the sending unit 12 may be subject to a high degree of installation torque and hence it is desirable to have the seal unit locked securely in place, be free from leakage, and yet not overly stress the sending unit. Clearly, it will also be apparent that the installation will be subjected to thermal cycling; the present design is able to accommodate repeated cycles of growth and shrinkage in use.

In the preferred form of invention, the casing unit 60 is made from a steel material, and the inner margin 66 thereof may be coined or stamped into a reduced thickness. This casing is preferably made from a mild steel but may in some cases be made from other materials. The elastomeric seal body is preferably made from a modified synthetic rubber, such as a nitrile or like synthetic elastomer, but may be made from high temperature resistant elastomers such as fluroelastomers of a kind known to those skilled in the oil seal manufacturing art. The illustrated form of invention uses three concentric sets of ribs but this number may vary from one upwards to three or more, as may the exact sizes and dimensions of the rubber formations. However, it is desirable to provide the separate rib formations, inner margins with the means for retaining the seal during assembly, and in addition, to provide a collar or other formation of increased axial width to provide the capability for controlled deformation during installation.

Integral ears 88 are shown as the preferred form of shank-engaging elements, but it will be understood that various other formations may be used as alternatives.

The expressing "sending unit" has been used as an illustration in the specification; however, any condition-sensing unit, whether technically a sending unit or not, may be sealed. Hence, in the claims, the more generic expression "sending unit" is used.

It will thus be seen that the present invention provides an improved oil seal unit and combination sending or sensing unit and seal having a number of advantages and characteristics including those pointed out herein and others which are inherent in the invention. A preferred form of the invention having been described by way of example, it is anticipated that variations and modifications to the form of seal and sending unit shown will occur to those skilled in the art and that changes and modification to such products may be made without departing from the spirit of the invention or the scope of the appended claims.

We claim:

1. An oil seal unit for disposition between portions of mating parts having opposed end face sealing surfaces and means for urging said mating parts together in fluid-tight relation, with one of said mating parts also having a shank portion adapted to extend axially through an associated seal unit, said oil seal unit comprising, in combination, a casing unit having an axially extending centering flange portion and a radially extending bonding flange portion with opposed end face surfaces and an inner margin portion, and an elastomeric seal body bonded to said casing unit, said body having radially inner, outer and intermediate seal body portions, said radially outer elastomeric seal body portion including at least one substantially continuous circumferential sealing rib overlying one of said casing end face surfaces and at least one substantially continuous circumferential sealing rib overlying the other of said casing end face surfaces, said radially inner portion of said elastomeric seal body including a radially extending web terminating in a radially inner, axially extending web surface portion defining an opening through which said shank portion of said one mating part may extend, said web also including means forming a part thereof for engaging said shank portion of said one mating part so as to support said seal relative to said one mating part, said intermediate seal body portion including an element adapted to be deformed into snug fluid-tight sealing engagement within a recess defined in part by said seal unit and in part by said opposed end face sealing surfaces forming said portions of said mating parts.

2. An oil seal unit as defined in claim 1 wherein said at least one sealing rib overlying said one end face surface and said at least one sealing rib overlying said other end face surface comprise a plurality of ribs overlying each of said casing end face surfaces.

3. An oil seal unit as defined in claim 1 wherein said at least one sealing rib comprises three ribs overlying each of said casing end face surfaces.

4. An oil seal unit as defined in claim 1 wherein said element adapted to be deformed into snug fluid-tight sealing engagement comprises a generally cylindrical collar having an annular shoulder surface of reduced axial extent lying radially inwardly thereof.

5. An oil seal unit as defined in claim 1 wherein said means forming a part of said web for engaging said shank of said one mating part comprises a plurality of radially inwardly extending ears formed on said axially extending web surface which defines said shank-receiving opening.

6. In combination, a condition sensing unit adapted for use with a remote instrument, said sensing unit having a shank portion adapted to extend into a portion of a vehicle crankcase oil pan, means associated with said vehicle crankcase oil pan for threadedly receiving and positioning said shank portion of said sensing unit, said sensing unit also including a radially extending flange element having an axially inwardly directed end face sealing surface and a radially outermost edge portion, with said associated crankcase oil pan having a sensing unit-receiving portion which includes radially inner and outer, coaxially arranged, outwardly directed end face surfaces axially offset from each other, and a composite oil seal unit disposed at least in part between said sensing unit end face sealing surface and said oil pan portion, said composite oil seal unit comprising, in combination, a casing unit having an axially extending casing centering flange spaced just radially apart from and surrounding said radially outermost edge portion of said sensing unit flange, and a radially extending bonding flange portion with opposed end face surfaces and an inner margin portion, and an elastomeric seal body bonded to said casing unit, said seal body having radially inner, outer and intermediate body portions, said radially outer elastomeric seal body portion including at least one substantially continuous circumferential sealing rib overlying one of said casing end face surfaces and at least one substantially continuous circumferential sealing rib overlying said other of said casing end face surfaces, said radially inner portion of said elastomeric seal body including a radially extending web terminating in a radially inner, axially extending surface portion defining an opening through which said sensing unit shank portion extends, said web also including means forming a part thereof for engaging said sensing unit shank portion so as to support said seal relative to said sensing unit prior to positioning said sensing unit within said oil pan, said intermediate seal body portion including an element adapted to be deformed into snug fluid-tight sealing engagement within a recess defined between said end face surface of said sensing unit flange and said radially inner end face surface on said sensing unit-receiving portion of said oil pan.

7. A combination as defined in claim 6 wherein said at least one rib comprises a plurality of ribs overlying each of said casing end face surfaces.

8. A combination as defined in claim 6 wherein said at least one sealing rib comprises three ribs on each of said casing end face surfaces.

9. A combination as defined in claim 6 wherein said element adapted to be deformed into snug fluid-tight sealing engagement comprises a generally cylindrical collar having an annular shoulder surface of reduced axial extent lying radially inwardly thereof.

10. A combination as defined in claim 6 wherein said means for engaging said sensing unit shank comprises a plurality of radially inwardly extending ears integrally formed on said radially inner, axially extending surface of said shank-receiving opening.

* * * * *